Figure 1:
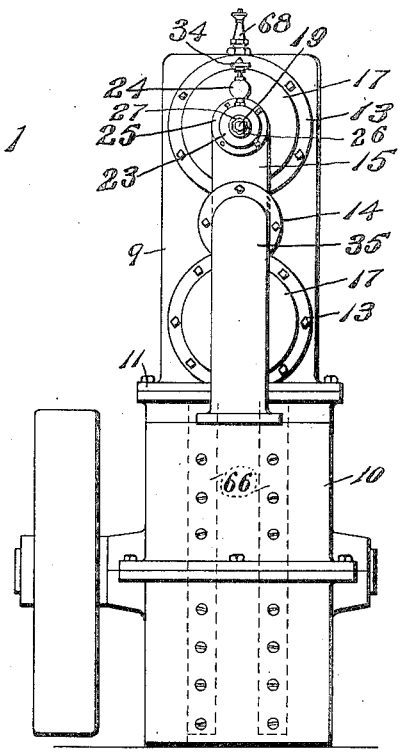

C. DRILL.
INTERNAL COMBUSTION ENGINE.
APPLICATION FILED MAR. 16, 1920.

1,375,902.

Patented Apr. 26, 1921.
2 SHEETS—SHEET 1.

INVENTOR
CHARLES DRILL
By Edward E. Longan
ATTY.

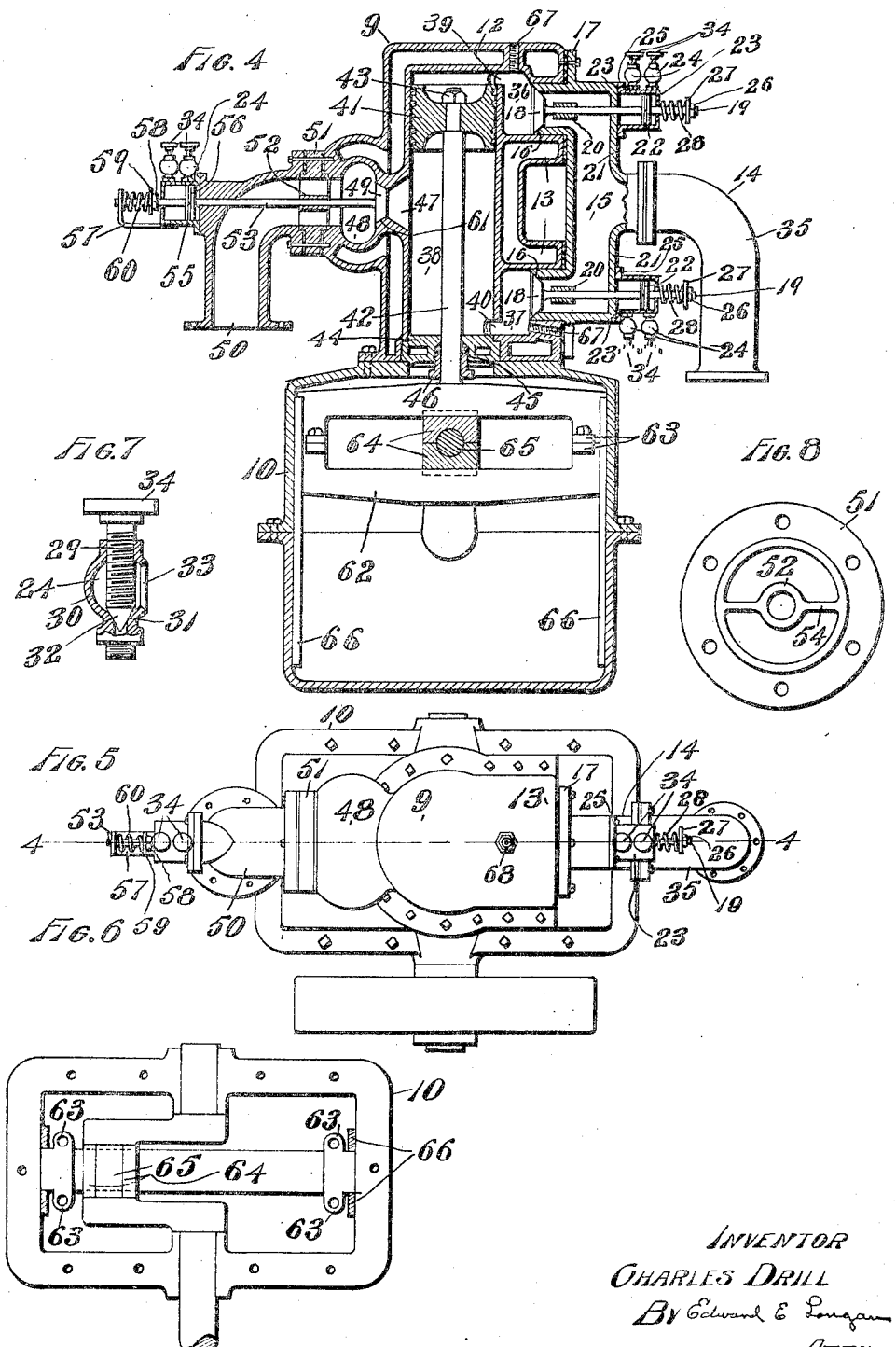

UNITED STATES PATENT OFFICE.

CHARLES DRILL, OF ST. LOUIS, MISSOURI.

INTERNAL-COMBUSTION ENGINE.

1,375,902.   Specification of Letters Patent.   Patented Apr. 26, 1921.

Application filed March 16, 1920. Serial No. 366,268.

*To all whom it may concern:*

Be it known that I, CHARLES DRILL, a citizen of the United States of America, and a resident of the city of St. Louis and State of Missouri, have invented certain new and useful Improvements in Internal - Combustion Engines, of which the following is a specification containing a full, clear, and exact description, reference being had to the accompanying drawings, forming a part thereof.

My invention relates to improvements in internal combustion engines, and has for its primary object the construction of an engine, in which an impulse is imparted to the piston head at every half revolution of the crank shaft.

A further object is to construct an internal combustion engine having two intake ports and one exhaust port, the intake ports being located on opposite ends of the cylinder and the exhaust port midway the length of the stroke.

A still further object is to construct an internal combustion engine in which the intake and exhaust valves are automatically operated, in other words, no cam shaft or cams are made use of.

Figure 2:
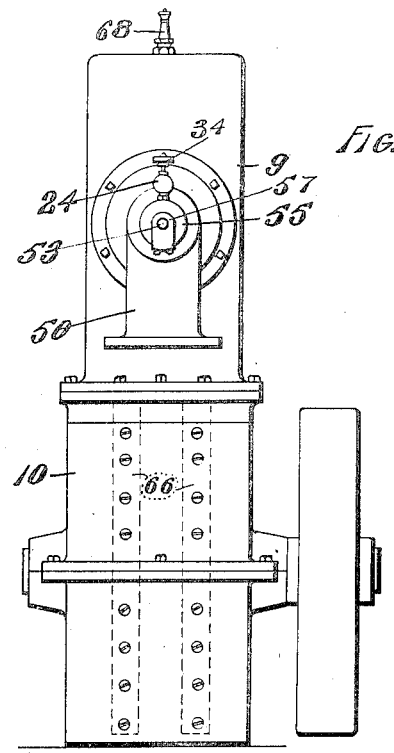
Figure 3:
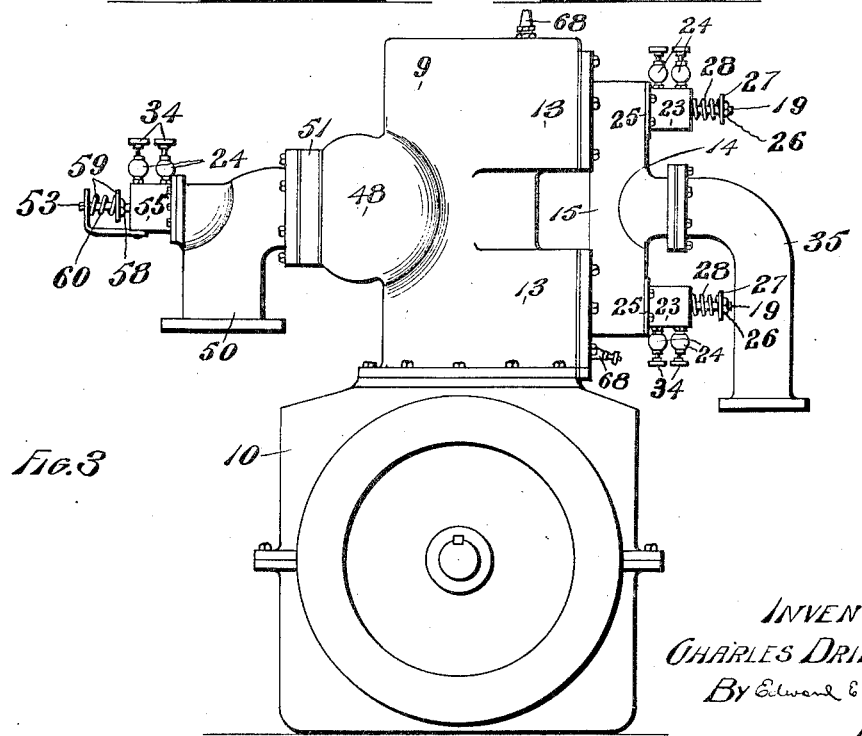

In the drawings:

Figure 1 is a side elevation of my device, showing the intake side;

Fig. 2 a similar view showing the exhaust side;

Fig. 3 an end view;

Fig. 4 a vertical cross section taken on the line 4—4 of Fig. 5;

Fig. 5 a top plan view;

Fig. 6 a view of the bottom portion of the casing showing the cross head and crank shaft, with parts removed and parts in section;

Fig. 7 an enlarged view of one of the valves made use of for controlling the intake and exhaust valve action; and Fig. 8 an enlarged view of the means for supporting and guiding the exhaust valve.

In the construction of my device, 9 represents the cylinder of an internal combustion engine and 10 the crank case. This cylinder is provided around its lower end with a flange 11 through which bolts are passed to secure it to the crank case. This cylinder is water jacketed as indicated by the numeral 12. On one side of the cylinder and integral therewith is formed a water jacketed projection 13 to which the intake manifold 14 is secured, this intake manifold consisting of a Y-shaped member 15 and in the arms of the Y are formed valve seats 16.

At a distance removed from the valve seats 16 are flanges 17 by means of which the manifold is secured to the projection 13. Located in the valve seats 16 are valves 18, these valves being each of the mushroom type and provided with a valve stem 19 which valve stem passes through the guide lug 20 located in each of the arms. The construction of this guide lug is the same as in Fig. 8, which will be described in detail later.

The valve stem 19 also projects through the wall 21 of the manifold 15 and is provided with a piston 22, this piston being located between the wall 21 and the outer end of the valve stem 19. Over this piston is placed a cylinder 23 which has relief valves 24 located near each end thereof. This cylinder is provided with flanges 25 by means of which it is secured to the manifold.

The outer end of the valve stem 19 is screw threaded and over this screw threaded portion is placed a nut 26 and washer 27, and between the washer 27 and the end wall of the cylinder 25 is placed a coil spring 28, the purpose of this coil spring being to regulate the tension on the valve, that is, to allow the valve to open or close more or less readily.

The valves 24 are globular in shape and are each provided with a needle valve 29 which is screwed into the casing 30. This casing is provided with a seat 31 for the conical end 32 of the needle valve. The casing 30 is also provided with an opening 33.

It will be readily seen that by turning the hand wheel 34 mounted on the needle valve 29, the valve can be removed from its seat in varying degrees, and thus permit a more or less ready escape and intake of air into the cylinder 23.

Secured to the foot of the Y or intake manifold is an elbow 35, and to the bottom of this elbow is attached the carbureter. This carbureter is of any well known type, and therefore is not shown, as it forms no part of my invention. Located at each end of the cylinder are the explosion chambers 36 and 37 which communicate with the cylinder 38 by means of the passageways 39 and 40. Within the cylinder is placed the piston head 41 which is secured to a piston rod 42 by means of a nut 43. The piston rod 42 extends through the water jacketed removable cylinder head 44 which is located at the lower end of the cylinder and is clamped between the cylinder 9 and the casing 10. This cylinder head is provided with a screw threaded opening 45 concentric with the piston rod and in this opening is placed a packing nut 46. The purpose of this is to pack the piston rod so as to prevent leakage from the cylinder into the crank case.

Midway between the passages 39 and 40 and diametrically opposite thereto is formed the exhaust port 47 which opens into an exhaust chamber 48. This exhaust chamber is practically globular in form and is water jacketed and formed integral with the cylinder 9.

Within this chamber is located the exhaust valve 49 which is similar in construction and operation to the valve 18. Secured to the exhaust chamber 48 is an elbow 50 and between the elbow and the exhaust chamber is clamped a ring 51, this ring being provided with a central bearing 52 through which the valve stem 53 of the valve 49 passes. This bearing 52 is held in place by means of ribs 54 which are formed integral with the bearing 52 and ring 51.

Secured to the elbow 50 is a cylinder 55 in which a piston 56 operates, the operation of this piston being controlled by valves 24 as has already been previously described. Secured to the cylinder 55 is an L-shaped projection 57 through which the piston rod 53 projects.

The outer end of the valve stem or rod 53 is screw threaded so as to receive the nut 58 and washer 59, and between the L-shaped member 57 and the washer 59 the coil spring 50 is interposed, this having a tendency to force the valve 49 against its seat 61 formed in the exhaust chamber 48. The opposite end of the elbow 50 is provided with a flange so that it can be connected to a muffler or to another piece of pipe and the exhaust led in any direction.

The lower end of the piston rod 42 is connected to a split yoke or cross head 62, this yoke being provided with with ears 63 for securing the two halves together and a central opening in which is slidably seated a split box 64, this box surrounding the crank 65.

This yoke extends completely across the crank chamber and at right angles to the crank shaft, and rides on the inner walls of the crank chamber, and in order to insure stability to the yoke, gibs 66 are secured to the crank casing and located on either side of the yoke, thus forming a guideway in which the yoke travels.

It will be noted from Fig. 4 that the valve stem supports or lugs 20 are located in the arms of the Y-shaped manifold. These lugs are formed integral with the manifold in the same manner as the bearing 52 is formed integral with the ring 51.

The operation of my device is as follows: The charge having been drawn into and compressed in the cylinder as in Fig. 4, which will then be at the top of the cylinder, is fired. This will drive the piston head downward, and the gases thus fired will continue to expand until the upper edge of the piston head reaches the upper edge of the exhaust port. By the time this position is reached, the gases have fully expanded and the charge below the piston head is being compressed. The downward travel of the piston head will continue until the lowest point is reached. During this time a vacuum is created above the exploded charge and a fresh charge drawn in. When the lowest point is reached, the charge below the piston head is exploded, forcing it upward. This upward movement will cause a compression of the exploded and fresh charges, and force the exploded charge out through the exhaust. That portion of the charge remaining above the exhaust opening is then compressed and fired. It is understood of course that the spring 60 only holds the valve 49 lightly against its seat so that it can readily be unseated by a small pressure exerted against it, and the exploded charge being fully expanded before the piston head commences to open the exhaust, there is no loss of power, due to the unexpanded charge escaping through the exhaust. During this operation the bearing 64 slides back and forth in the yoke 62 and imparts motion to the crank shaft. In this way it is possible to construct a long stroke motor which has very little height relative to the stroke, in other words, the combined height of the crank shaft casing and the cylinder is less than that required in a two or four cycle engine because the movement of the piston rod is vertical, and consequently the crank shaft casing can be shortened.

After the machine has been started, the valves 24 are so adjusted as to operate quickly but still not to slam back and forth when seating and unseating, thus eliminating noise, and another feature is that the exhaust is practically noiseless as the gases are discharged only under a very slight compression and not in a high state of compression as is now the case in internal combustion engines of the explosive type.

When assembling my device, the gibs 66 are secured to one portion of the crank shaft casing, and after the casing has been secured together, the gibs are secured to the other portion. This last mentioned securing is done from the outside although I may secure the ribs throughout their entire length from the outside of the casing.

It will be seen that by my construction I achieve as many explosions in a one cylinder engine in each revolution as is possible with a four cylinder four cycle engine or a two cylinder two cycle engine. This makes my device more economical as to space since the number of cylinders can be reduced and the same amount of power delivered. This is especially desirable in trucks, because whatever length of the truck can be saved by the use of my device can be added to the body, and thus a greater carrying capacity given each truck without lengthening the wheel base or having a large overhang at the rear of the vehicle.

As shown in the drawings, I form a screw threaded opening 67 in each of the explosion chambers. This is for the purpose of inserting the spark plugs 68 so that the charge contained in the explosion chamber may be fired.

Having fully described my invention, what I claim is:

1. An internal combustion engine of the explosive type, comprising a crank case, a crank shaft, a cylinder closed at both ends mounted on said crank case, a piston located within the cylinder, a piston rod secured to the piston and extending into the crank case, means for connecting the crank shaft and piston rod, a pair of inlet ports disposed on one and the same side of the cylinder, a single exhaust port located on the opposite side of said cylinder and midway between said inlet ports, inwardly operating valves located in the intake ports, an outwardly operating valve located in the exhaust port, said valve adapted to be unseated by the pressure within the cylinder, and a manifold secured to the cylinder at the inlet ports.

2. An internal combustion engine comprising a crank case, a crank shaft mounted therein, a cylinder closed at both ends mounted on said crank case, a piston located within the cylinder, a piston rod secured to the piston and extending into the crank case, a yoke slidably mounted in the crank case attached to the lower end of the piston, said yoke being reciprocably mounted within the crank case, an inlet port positioned near each end of the cylinder, a Y-shaped manifold connected to the inlet ports, an exhaust port located diametrically opposite and midway between the inlet ports and valves for opening and closing the inlet and exhaust ports.

3. An internal combustion engine comprising a crank case, a cylinder mounted thereon, a cylinder head located at each end thereof, an explosion chamber adjacent each cylinder head, said explosion chambers being formed integral with the cylinder and communicating with the interior thereof, a charge igniting means located in each explosion chamber, an intake manifold secured to the explosion chambers, valves mounted in the intake manifold and located in each explosion chamber, means for normally holding said valves in seated position, an exhaust chamber formed integral with said cylinder midway the cylinder heads and diametrically opposite the explosion chambers, a port for connecting the interior of the cylinder with the exhaust chamber, a valve for closing said port, means for normally holding said valve in closed position, means for regulating the speed of action of said valves, a piston head located in said cylinder, a piston rod connected to the same, said piston rod extending through one of the cylinder heads, a crank shaft located in the crank casing, and means for connecting said piston rod to said crank shaft.

4. An internal combustion engine comprising in combination with a crank case and a crank shaft mounted therein, of a cylinder mounted on the crank case, a piston head located in said cylinder, a pair of cylinder heads secured to the cylinder, a piston rod extending through one of said heads, a yoke for connecting the piston head with the crank shaft, ribs located in the crank case for guiding said yoke, an explosion chamber formed in the cylinder and adjacent each cylinder head, an ignition means mounted in each explosion chamber, an intake manifold connected to said explosion chamber, an exhaust chamber formed on the cylinder midway between and diametrically opposite the explosion chambers, and valves for opening and closing said intake manifold and exhaust chamber.

5. An internal combustion engine comprising in combination with a crank case, a crank shaft and its operating means, of a cylinder closed at its upper end secured to the crank case, a cylinder head having a central opening secured between the cylinder and crank case, a stuffing box surrounding said central opening, a piston rod extending through said opening and into the cylinder, an explosion chamber located adjacent each end of the cylinder, ignition means removably secured in each explosion chamber, a manifold connected to said explosion chambers, an exhaust chamber formed midway the length of the cylinder and diametrically opposite the explosion chamber, valves located in each explosion chamber for opening and closing the manifold, and a valve for opening and closing the exhaust chamber.

6. An internal combustion engine comprising in combination with a crank case, a crank shaft and its operating means, of a cylinder closed at its upper end secured to the crank case, a removable cylinder head having a central opening mounted and secured between the cylinder and crank case, a stuffing box surrounding said central opening, a piston rod extending through said opening and into the cylinder, an explosion chamber located adjacent each end of the cylinder, a manifold connected to said explosion chambers, an exhaust chamber formed midway the length of the cylinder and diametrically opposite the explosion chamber, a valve located in each explosion chamber for opening and closing the manifold, and a valve for opening and closing the exhaust chamber, and means for normally holding the valves in seated position.

7. An internal combustion engine comprising in combination with a crank case, a crank shaft and its operating means, of a cylinder closed at its upper end secured to the crank case, a cylinder head having a central opening secured between the cylinder and crank case, a stuffing box surrounding said central opening, a piston rod extending through said opening and into the cylinder, said piston rod having its one end connected to the piston head, its opposite end to the crank operating means, an explosion chamber located adjacent each end of the cylinder, a manifold connected to said explosion chambers, an exhaust chamber formed midway the length of the cylinder and diametrically opposite the explosion chamber, valves located in each explosion chamber for opening and closing the manifold, a valve for opening and closing the exhaust chamber, means for normally holding the valves in seated position, and means for regulating the valve action.

In testimony whereof, I have signed my name to this specification.

CHARLES DRILL.